(12) United States Patent
Kerschbaum et al.

(10) Patent No.: US 7,836,483 B2
(45) Date of Patent: Nov. 16, 2010

(54) AUTOMATIC DERIVATION OF ACCESS CONTROL POLICIES FROM A CHOREOGRAPHY

(75) Inventors: Florian Kerschbaum, Karlsruhe (DE); Philip Robinson, Karlsruhe (DE)

(73) Assignee: SAP AG, Walldorf (DE)

( * ) Notice: Subject to any disclaimer, the term of this patent is extended or adjusted under 35 U.S.C. 154(b) by 1237 days.

(21) Appl. No.: 11/413,716

(22) Filed: Apr. 28, 2006

(65) Prior Publication Data
US 2007/0256116 A1    Nov. 1, 2007

(51) Int. Cl.
*G06F 17/00* (2006.01)
(52) U.S. Cl. .......................................................... 726/1
(58) Field of Classification Search ...................... 726/1, 726/23, 24; 713/152, 153, 182
See application file for complete search history.

(56) References Cited

U.S. PATENT DOCUMENTS

| | | | | |
|---|---|---|---|---|
| 7,711,832 | B1 * | 5/2010 | Champion et al. ........... | 709/228 |
| 2005/0198206 | A1 * | 9/2005 | Miller et al. ................. | 709/219 |
| 2006/0059029 | A1 * | 3/2006 | Chalasani et al. ............. | 705/8 |

OTHER PUBLICATIONS

Foster et al. "Leveraging Eclipse for Integrated Model-Based Engineering of Web Service Compositions" Oct. 16-17, 2005, pp. 95-99.*

Mendling et al—An Approach to Extract RBAC Models From BPEL4WS Processes—IEEE International Workshope on Enabling Technologies: Infrastructures for Collaborative Enterprises—2004 Modena, Italy—6 Pages.

Georgiadis et al—Flexible Team-Based Access Control Using Contexts—SACMAT 2001, May 3-4, 2001 Chantilly, VA—8 Pages.

Thomas et al—Conceptual Foundations for a Model of Task-Based Authorizations—7th IEEE Computer Security Foundations Workshop, Franconia, NH Jun. 1994—pp. 1-22.

Thomas et al—Task-Based Authorization Controls (TBAC): A Family of Models for Active and Enterprise-Oriented Authorization Management—IFIP WG11.3 Workshop on Database Security, Lake Tahoe, CA Aug. 11-13, 1997, 16 Pages.

Yao et al—A Model of Oasis Role-Based Access Control and Its Support for Active Security—SACMAT 01, May 3-4, 2001 Chantilly, VA—11 Pages.

Kang, et al, "Access Control Mechanisms for Inter-Organizational Workflow", ACM Workshop on Role Based Access Control, Proceedings of the sixth ACM symposium on Acess control models and technologies, Chantilly, Virginia, United States, (2001), 9 pages.

Knorr, "Dynamic Access Control Through Petri Net Workflows", Proceedings of the 16th Annual Computer Security Applications Confrence, (2000), 9 pages.

* cited by examiner

*Primary Examiner*—Beemnet W Dada
(74) *Attorney, Agent, or Firm*—Blakely Sokoloff Taylor & Zafman (57) ABSTRACT

A system architecture and algorithm for automatically generating, installing and enforcing access control policies that correspond to an agreed specification of collaboration. A collaboration member enforces its access control policies using a dedicated access controller separate from a workflow engine. In one embodiment, each access control policy contains extensions which can direct an access controller to selectively enable or disable various access control policies upon authorization of an access request.

15 Claims, 5 Drawing Sheets

AUTOMATIC DERIVATION OF ACCESS CONTROL POLICIES FROM A CHOREOGRAPHY

BACKGROUND OF THE INVENTION

1. Field of the Invention

The present invention relates generally to controlling interactions between members of a collaboration. In particular, the present invention addresses limitations in implementing control-flow and access control when participating in a collaboration.

2. Background Art

Collaborative business processes rely on close agreement between participants concerning control-flow decisions between workflow systems and access control to member resources. As participating members interact, members update access control policies corresponding to a change in control-flow state resulting from their interaction. Traditionally, participants in a collaboration use explicit representation of control-flow states. In explicit representation, control-flow state information is maintained separate from an access control policy. The exclusion of control-flow information from policies results in primitive access controls, wherein a given policy defines a triplet <subject s, object o, action a>. This primitive access control policy states that a subject s can perform action a on object o. The protection state of a system at any given time is represented by the collection of triples installed across the set of access controllers in the system. A subject s makes a request to perform an action a on an object o according to a matching access control. The subject s must be authenticated or prove possession or a role or capability that allows the particular type of action a to be performed on object o.

Explicit representation and the use of primitive access control depends on reconfiguration of access control policies by a control-flow component, e.g. a workflow engine. However, access control is not sufficiently central to workflow engine functionality, and system administrators are tasked with low-level configuration of access control policies on the workflow engine. This manual configuration tends to be error-prone given its technical complexity and the time constraints under which the system administrators are placed. As collaborations grow in size, speed and complexity, the potential for these errors increases.

Collaborations are growing in complexity as participants increasingly turn to collaboration choreography. Collaborative organizations are using descriptive choreography to represent the relationship between collaboration members and the interactions that take place between them. Choreographies describe a collaboration from a global point of view, focusing on the observable behaviors by the participants. An overall description of the collaboration uses a choreography (in a choreography description language) while the individual members specify their access controls using their own languages. The standardization and convenience offered by choreography languages allows for more sophisticated collaborative business processes.

The Web Services Choreography Description Language (WS-CDL) (N. Kavantzas, D. Burdett, et al. Web Services Choreography Description Language Version 1.0, available at http://www.w3.org/TR/ws-cdl-10/, 2005) is one example of an emerging, XML-based standard for a language to describe a choreography, specifically for a web service collaboration. WS-CDL consists of type definitions, activities and variables. Some examples of WS-CDL type definitions include RoleType, ParticipantType, RelationshipType and ChannelType. Data types are defined as InformationTypes and Tokens. WS-CDL activities form the basic description of how actions take place in the collaboration. Notable activities include control-flow statements (Sequence, Parallel, and Choice), web service calls (InterAction), internal actions (SilentAction and NoAction) and variable assignment (Assign). WorkUnit is an activity that encompasses other activities and allows conditions to be set for their execution or repetition. Through these and other elements of WS-CDL, a complete descriptive choreography can be provided for highly sophisticated collaborations. While WS-CDL is one example of descriptive choreography, the present invention is directed toward any choreography-based collaboration.

The most sophisticated collaborations to date are embodied in the concept of a virtual organization (VO). A VO is a collection of autonomous parties that use information technology to virtually combine their resources and exchange information in order to collectively address a business objective. By way of contrast, non-virtual collaborations must physically move and transport resources and information. The VO may quickly form once the parties electronically communicate their consent to participation, and can immediately cease to exist once the business objective has been achieved. A VO provides easier access to information and functionality, which have a sensitivity and price associated with them. It is therefore necessary to more closely specify, order and limit the set of transactions and resource accesses that can occur between collaborating parties in a VO. As mentioned above, the present invention is directed to all collaborations, and is not limited to virtual organizations.

Sophisticated collaborations such as VOs reveal the inadequacy of implementing access control under current methods. It is not feasible for these collaborations to rely on a dedicated system administrator to manually configure access control as part of the operation of a workflow engine. The present invention is a response to the need for high-level, on-demand generation of access controls policies directly from the choreography.

SUMMARY OF THE INVENTION

A method is described in which a set of access control policies are generated and enabled according to a choreography. Upon initialization of the choreography, a dedicated access controller enables an initial policy selected from the set of access control policies. In one embodiment, each access control policy contains an enablement state which is set according to the current control-flow state of the choreography. In another embodiment, each access control policy includes an enablement plan whereby the enablement states of access control policies are changed according to a change in control-flow state.

BRIEF DESCRIPTION OF THE DRAWINGS

FIG. 5b is a block diagram showing the matching of an interaction message to an access control policy according to the implementation of FIG. 2, using the access control policy of FIG. 5a.

DETAILED DESCRIPTION OF THE PREFERRED EMBODIMENTS

The present invention is an architecture and algorithm for deriving access control policies from a choreography. To better enforce access control policies in a collaboration, the invention is directed toward three goals:
1. maintaining a functional separation between the concern of access control enforcement by access controllers and that of control flow execution by workflow engines;
2. generating minimal access control policies for implementation of a choreography; and
3. aligning the activation and deactivation of access control policies with the control flow of the choreography.

The invention decouples the access control decisions from the control-flow decisions of the workflow engine and allows them to be deployed independently. In one embodiment, the use of a dedicated access controller is achieved by implicit representation of the control-flow state by the access control policies. Implicit representation of control-flow states allows access control administration to be made on the business level of a choreography instead of on the technical level of a policy.

As discussed previously, explicit representation uses independent control-flow state information for low-level configuration of the completely separate primitive access controls. In the present invention, rather than install and remove primitive access control policies, the policies are extended to provide an enablement plan determining "how," "when" and "why" the <s, o, a> triples are enabled or disabled. Primitive access controls are passive, while an access control that implements these extensions is active. The simplest active access control is the quadruple <s, o, a, q>, where q is a predicate on the system state that must evaluate to true for the primitive part of the access control to be allowed. Access control policies are active when they also take on some role in representing the control-flow state. A separate decision or rule engine component has to be created for updating the system state and the enablement state of access controls on the access controller. Otherwise an administrator must monitor the operational state of the system and manually update the authorizations.

The architecture for a collaboration member practicing the invention includes a dedicated policy generator component (PGC), an access controller acting as a policy decision point (PDP), a policy enforcement point (PEP), and the resources whose access is controlled. The policy generator uses the received choreography to generate a control-flow map. The control-flow map consists of nodes representing the various control-flow states of the entire collaboration system. The nodes of the control-flow map are connected by interactions wherein any two collaboration members communicate in a way which changes the state of the system. Each interaction connects the previous system state/node to a successor system state/node. The collaboration member develops access control policies for those interactions with which it is involved, making sure that a policy in place at any given time corresponds to the current state of the collaboration system.

In the present invention, the policy generator uses active access control comprised of extended control policies. Each access control policy is appended to include an identifying policy number by which it can be referred by other policies. Each policy has a status extension to represent the policy as being either enabled or disabled. Each policy has an extension containing a list of policies to be enabled subsequent to the enforcement of the given policy. Finally, each policy has an extension containing a list of policies to be disabled subsequent to the enforcement of the given policy. After these policies are created, the lists of policies to be enabled and disabled are populated to represent a corresponding node and its respective control-flow state. These populated sets represent the enablement plan for a given access control policy.

In the present invention, all of the policies are created in a disabled state. When the collaboration is initialized, a set of policies are enabled corresponding to the beginning of the control-flow. When an access request is received, the subject, object and action of the request are compared to the currently enabled policies to see if any one policy allows the request. Once a matching policy is found, the request is allowed and the matching policy is analyzed for its enablement and disablement lists. Those policies identified by the numbers contained in the lists are either enabled or disabled according to the lists, resulting in a group of enabled policies which represents the control-flow state resulting from the allowed request.

Figure 1:
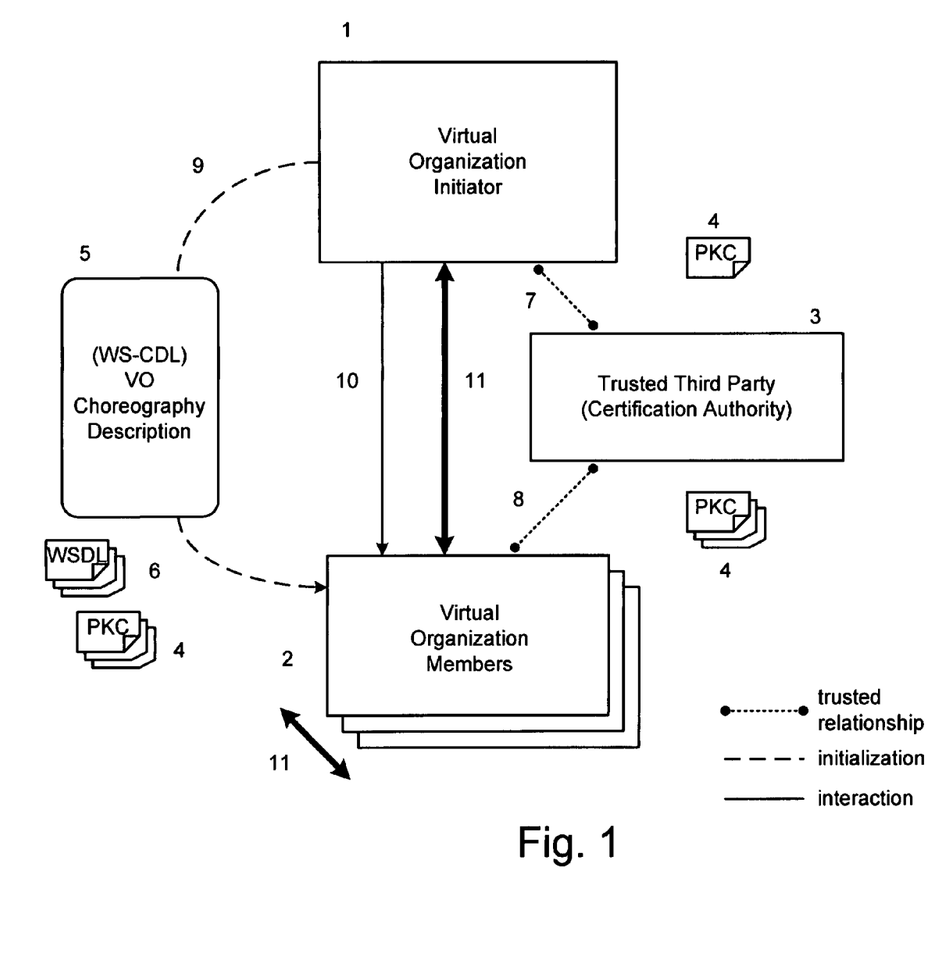
FIG. 1 is a block diagram showing the interactions and trust relationships between the components and actors of a collaboration.

FIG. 1 shows the structure of a virtual organization (VO) in which one embodiment of the present invention may be practiced. For illustration, the following discussion describes one embodiment of the present invention wherein the collaboration of FIG. 1 is implemented using WS-CDL.

The key parties in the VO are:
1. VO Initiator—the party that initially defines the business objective and its associated choreography, and searches for partners to match the roles in the choreography.
2. VO members—the parties selected by the initiator to perform particular roles in the choreography. VO members may directly interact with one another electronically, independent of the VO initiator. When the VO exists and operates, the VO initiator can also interact with it as a VO member.
3. Trusted Third Parties—entities that are trusted by the initiator and members to validate identities and reputations of partners in a VO. A certificate authority is one example of a trusted third party.

Any one collaboration member has to generate its own access control policies before the collaboration can begin. Specific trust relationships need to be in place in order for the access control generation algorithm to be trustworthily executed. In one embodiment, these relationships are established through a public-key certificate (PKC) system. In 7, the VO initiator 1 requires a PKC 4 from the certificate authority 3 that asserts its claim to be the initiator of the particular VO. Given that the VO is registered in a unique namespace with a unique identifier $VO_{id}$, the certificate for the initiator 4 received from the authority 3 will have the format Cert(subject=InitiatorIdentity, keyinfo=$PK_{Initiator}$, extension=Claim(isInitiator, $VO_{id}$), issuer=$PK_{Authority}$). In 8, the identities of all VO members 2 must also be validated by the certificate authority 3, as well as the claim that they have been selected to play a role $r_{name}$ in the choreography $VO_{id}$. The certificates for the members 4 received from the authority 3 will have the format Cert(subject=MemberIdentity, keyinfo=$PK_{Member}$, extension=Claim($r_{name}$, $VO_{id}$), . . . , issuer=$PK_{Authority}$). In 9, the initiator 1 sends the choreography description 5 to the policy generator of each member 2 in the VO authenticating itself with the initiator certificate. In various embodiments, the choreography 5 is described in WS-CDL, the choreography 5 includes service descriptions such as WSDLs 6, and the choreography contains PKCs 4 of all members 2.

Although not shown in FIG. 1, the policy generator of a VO member practicing the present invention derives the access control policies and installs them at the access controller upon approval of the choreography by an administrator, i.e., the administrator has only to verify the choreography and that it conforms to the collaboration (VO) as specified. The administrator does not need to be concerned with the details of access control policies, but can instead make business-driven, high-level decisions. In one embodiment, this approval of the choreography is automated.

After member's have installed their respective access controls, the VO initiator 1 sends an initiator message 10 to the VO members 2 to indicate that the choreography is in the operation state. Members's policy generators enable the first access control policy (or policies) of the choreography. The VO is now ready for interactions 11 to take place among the VO members 2 and the VO initiator 1.

Figure 2:
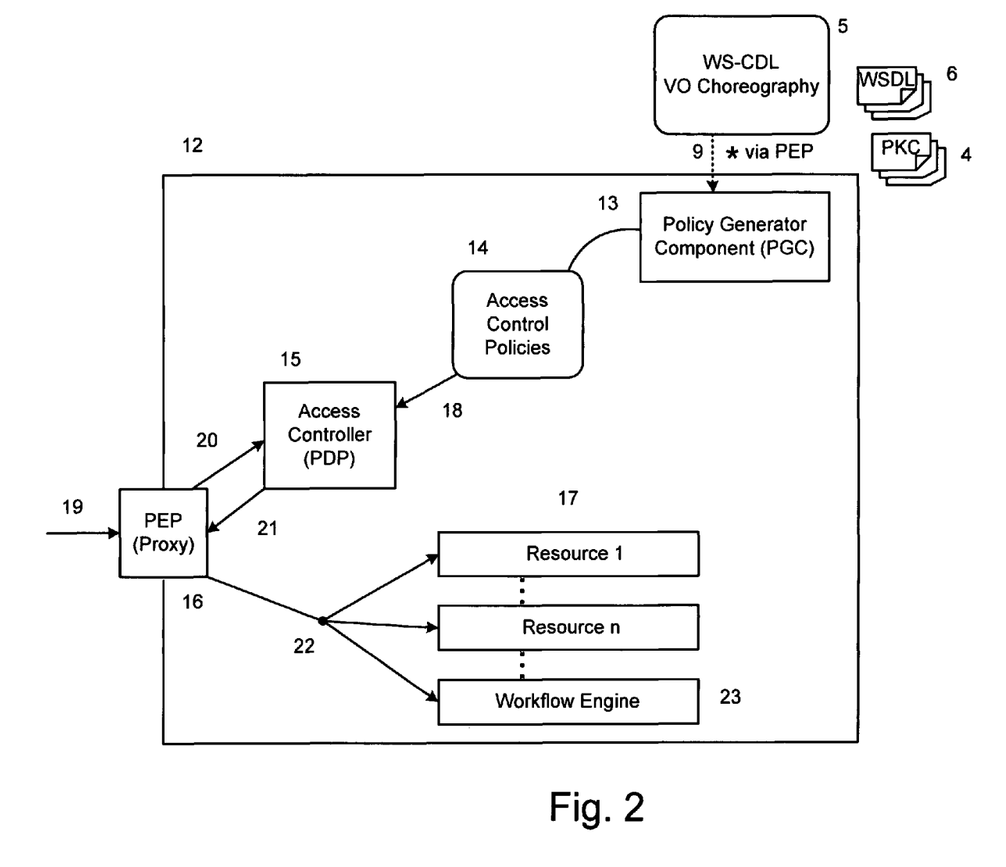
FIG. 2 is a block diagram showing implementation of access control policies by a participant in the collaboration of FIG. 1.

FIG. 2 shows how any one VO member 12 from among the group of VO members 2 derives and enforces access control policies 14 based on the receipt of a choreography 9. The relevant components of the VO member's 12 architecture are:

1. Policy Generator Component (PGC) 13: interprets the choreography description 5 and generates the access control policies. In various embodiments, the policy generator also uses a service description 6 (such as WSDL) which contains the end point references (EPR) of the target objects. In another embodiment, the policy generator uses the public key certificates 4 (PKC) of the selected members.
2. Policy Enforcement Point 16: receives the request message 19, authenticates the subject of the message, contacts the access controller 15 and forwards only authenticated and authorized message requests 20 to the appropriate access controller.
3. Access Controller/Policy Decision Point 15: makes access control decisions based on policies, and manages the state of enablement of the policies. In one embodiment, the access controller receives the triple <s, o, a> extracted from the authorized request 20 by the PEP 16, and outputs either an authorization or a denial message 21.
4. Resources 17: the objects to which access is requested and invoked according to the control flow. One of the most important resources is the workflow engine, the component that handles the internal control flow of when resources are to be invoked and manages all steps in the collaboration Upon receiving the descriptive choreography 5, the policy generator 13 develops the access control policies 14 which will represent control-flow states implicitly, in accordance with the alogrithm. In one embodiment, this algorithm is prefaced by verification of all collaboration members, their certificates and their respective roles. As discussed below, one embodiment of the implicit representation includes the policy extensions $l_{enable}$ and $l_{disable}$. The algorithm for this embodiment is as follows:

1. Derive control-flow map with all intermediate nodes from the choreography;
2. Filter all InterActions that do not have oneself as a target, i.e., remove all InterActions that do not result in a local access (and therefore a local access policy);
3. Remove all nodes that do not contain InterActions by directly linking predecessors and successors (Exception: Empty nodes in parallel are simply removed);
4. Create policies which are disabled and contain empty $l_{enable}$ and $l_{disable}$ sets;
5. Compute $l_{enable}$ and $l_{disable}$ sets for each policy; and
6. Install policies on the access controller and enable an initial policy (or policies) on request.

The active policy elements $1_{enable}$ and $1_{disable}$ trigger, respectively, the selective enablement and disablement of other access control policies. After a given policy is enforced, the state of enablement of the sets of policies has to be changed to represent the control-flow state which results from the interaction matching the enforced policy. Population of these sets $1_{enable}$ and $1_{disable}$ depends on the successors and predecessors to a node on the control-flow map. Let $pred_i(N)$ denote the set of sequential predecessors of node N for $i=1, \ldots p$ where i is the i-th parallel activity, i.e., one of each $pred_1(N), pred_2(N), \ldots, pred_p(N)$ has occurred before N. Similarly, let $succ_i(N)$ denote the set of sequential successors for the i-th parallel activity for $i=1, \ldots q$, i.e., one of each $succ_1(N), succ_2(N), \ldots, succ_q(N)$ will occur after N. Let pred(N) and succ(N) denote the union of all parallel activities, i.e., $pred(N)=\cup_{i=1}^{p} Pred_i(N)$ and $succ(N)=\cup_{i=1}^{q} succ_i(N)$. Let $pred_N(M)$ and $succ_N(M)$ denote the set of predecessors and successors, respectively, of M of that activity that contains N. Due to the syntax of parallel in WS-CDL this set is unique. The same notation may be used when applying predecessor and successor operators to sets, i.e., the operator is applied to each element in the set removing duplicate results. For example, succ(pred(N)) denotes the set of all possible sequential and parallel siblings of N (including N itself). The creation of policies in step 4 of the above alogrithm requires the subject, object and action information for each policy. Each InterAction is analyzed for this purpose. In a WS-CDL embodiment, the subject is the canonical name as extracted from the certificate for the role (attributeftomRole in the participant element). The object is the web service EPR from the WSDL file referenced in the behavior element of the roleType with the name of the operation attribute from the Interaction. The action is the method called for the web service and in this convention represents the operation attribute. With this information a draft of the policies is created such that each policy is disabled, but each policy has a policy-id assigned. Each policy is associated with a node in the control-flow and, after the removal of empty nodes, each node has one policy associated with it, i.e., control-flow nodes and policies can be used interchangeably. The set $1_{disable}$ is the set of all alternative sequential choices, i.e., for each node N, $$l_{disable} = succ_N(pred(N))$$

Note that this includes N itself, i.e., by default each policy is disabled after it has been activated unless the control-flow allows it to be reactivated. The set $1_{enable}$ is the set of all successors of a node N, $$l_{enable} = succ(N)$$

Since a node may be contained in both $1_{enable}$ and $1_{disable}$, e.g., a loop to itself (in a WorkUnit activity with repetition), both sets must be postprocessed to remove from the sets all elements contained in both sets.

$$\phi = l_{disable} \cap l_{enable}$$

$$l_{disable} = l_{disable} \backslash \phi$$

$$l_{enable} = l_{enable} \backslash \phi$$

The postprocessed policies need only be places in an initialization state to allow the choreography to start.

The architecture clearly shows the separation between the access control and workflow execution. All access control enforcement is done by the PEP in collaboration with the access controller while the workflow engine is free to focus on the business process.

Figure 3:
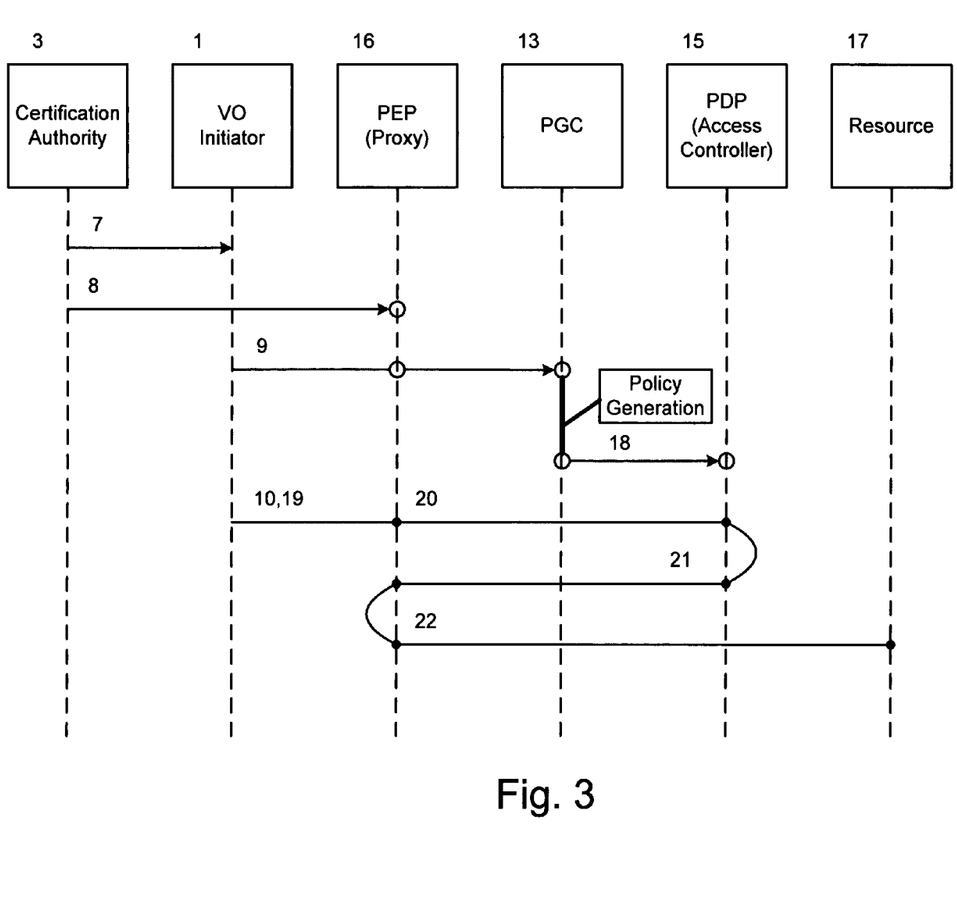
FIG. 3 is a sequence diagram showing the derivation and enforcement of access control policies according to the implementation of FIG. 2.

FIG. 3 shows a process for deriving and enforcing access control policies in one embodiment of the invention according to the architecture in FIG. 2. In 7, the certification authority 3 sends the VO initiator 1 certification 4 to begin the collaboration. In 8, the certification authority 3 sends certification 4 to a given VO member 12 via the member's PEP 16, which authorizes participation in the collaboration according to the member's appointed roles. In 9, the VO initiator 1 sends a copy of the descriptive choreography 5 to the policy generator component 13 via the PEP 16. The PGC 13 then generates access control policies for installation 18 on the access controller 15.

After initialization of the system 10 by the VO initiator 1, an interaction request 19 is received by the VO member 12 via the PEP 16. For authenticated access requests, the PEP 16 extracts the access control information 20 <s, o, a> from the access request 19 and sends it to the access controller 15. The access controller 15 returns either an authorization or a denial 21 to the PEP 16, according to the currently enabled access control policies. In response to an authorization, the PEP 16 invokes 22 the appropriate resource 17, e.g., the workflow engine 23. The resource 17 only accepts requests forwarded by the PEP 16. In one embodiment, the PEP is a proxy server residing on a firewall protecting all access to the domain according to a perimeter security model.

Figure 4:
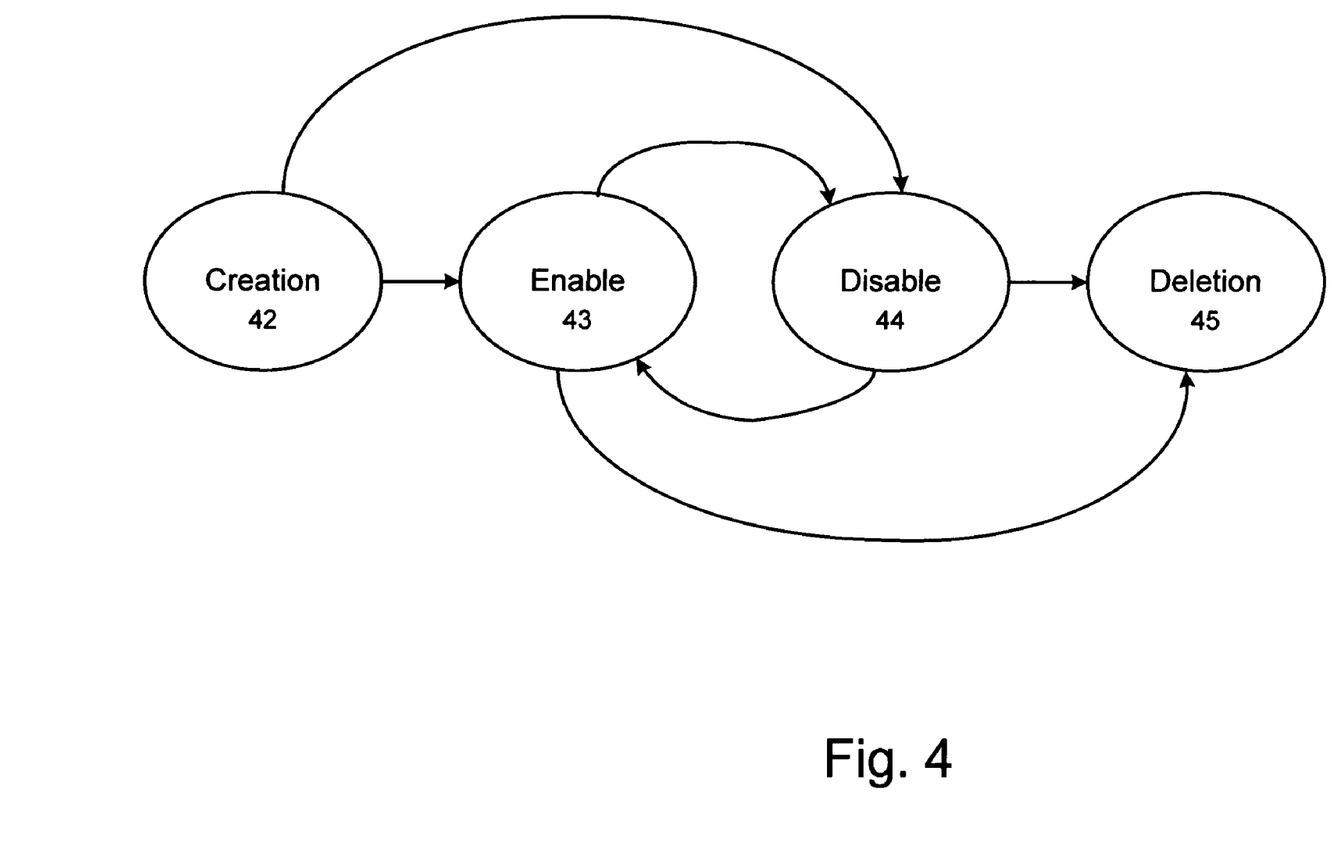
FIG. 4 is a state model for the creation and enablement of access control policies under the implementation of FIG. 2.

FIG. 4 shows a state diagram for the sequential enablement and disablement of active access control policies as implemented in one embodiment of the present invention. The state model shows an access control policy being created at 42 and alternately enabled 43 and disabled 44 during the execution of a collaboration. A policy is deleted 45 when it is no longer needed to represent a control-flow state for the collaboration. A given policy will not be considered if it is disabled when an given access request is received, but it is capable of being enabled and thus considered if its enablement is required to represent the control flow state which results from the given access request. Similarly, after enablement the enforcement of the given policy will result in a change in control-flow state of the system that may require disablement of the given policy. One embodiment of this sequential triggering among active control policies for implicit control-flow representation is shown in FIG. 5a and 5b.

Figure 5A:
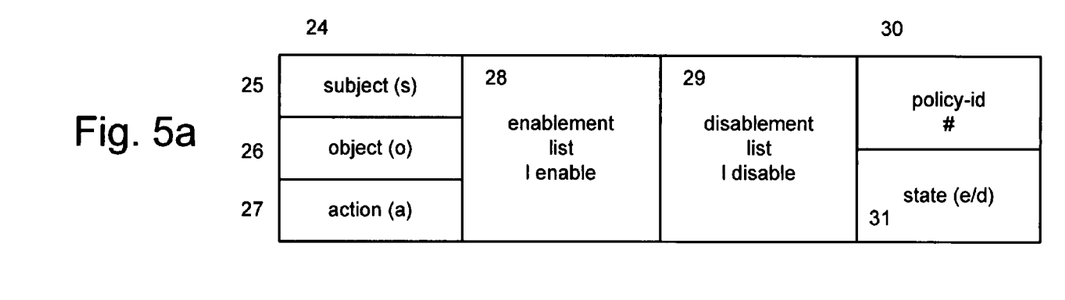
FIG. 5a is a block diagram representing the information contained in an access control policy usable to implement the state model of FIG. 4.

FIG. 5a shows one embodiment of access control policy extension for implicit control-flow state representation. In addition to subject 25, object 26 and action 27, the invention extends an access control policy 24 with two mechanisms to track control-flow. Each policy is annotated with two additional fields $l_{enable}$ 28 and $l_{disable}$ 29, one set of policies that are enabled and one with policies that are disabled after a policy has been successfully matched. Each policy is further extended to include as a policy identifier a unique integer policy-id 30. The policies are also extended to include a binary value state 31 representing that policy's current state as either enabled or disabled. Disabled policies are not considered during an access request, but may be enabled after the request if a resulting resource access brings about a control flow state associated with the policy. Let $l_{enable}$=policy-id$_1$, policy-id$_2$, . . . , policy-id$_n$ be the set of policies to enable and $l_{disable}$=policy-id$_1$, policy-id$_2$, . . . , policy-id$_n$, be the set of policies to disable. The result of these extensions is a 7-tuple policy of <policy-id, s, o, a, $l_{enable}$, $l_{disable}$, state>, where s, o, and a represent the primitive elements of access control.

Figure 5B:
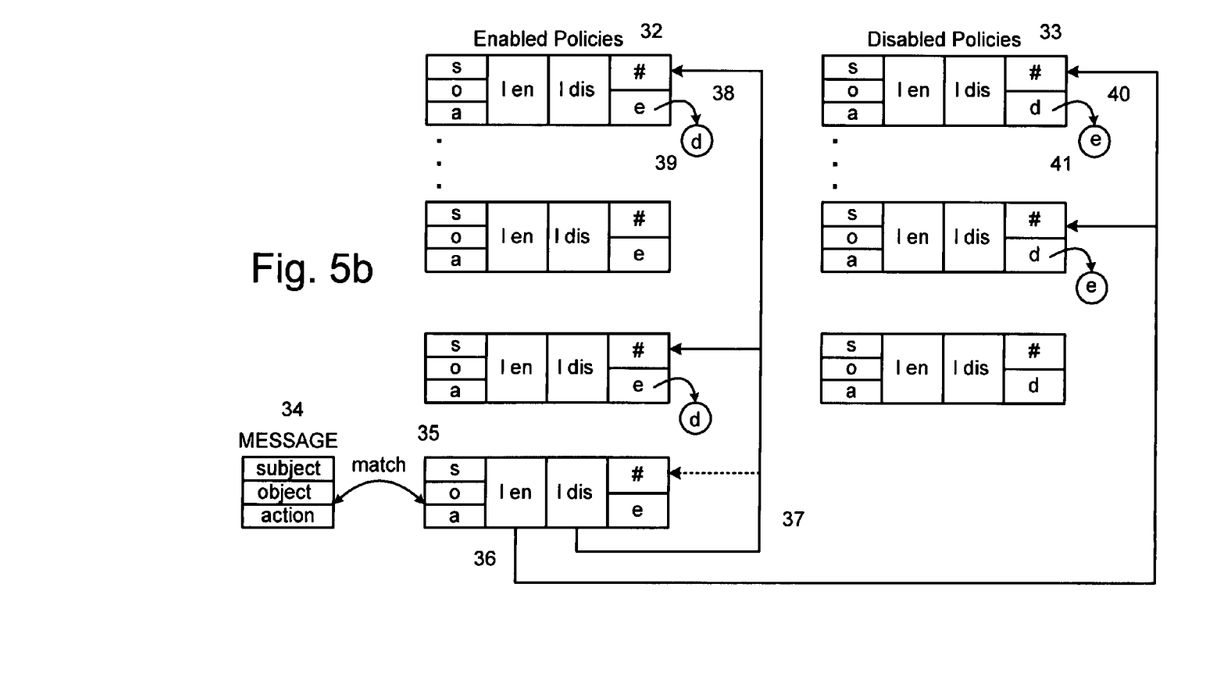

FIG. 5b shows how the extended 7-tuple policy of FIG. 5a is used to enable or disable other access control policies of its kind. At any time during the collaboration, an access request 19 is received via the PEP 16. The PEP 16 sends the primitive triple 34 to the access controller 15 for authorization according to the currently enabled access control policies 32. FIG. 5b shows the access controller's 15 set of currently enabled policies 32 and set of currently disabled policies 33. In one embodiment, the access controller starts with an implicit deny policy and allows an access request upon matching it to any one enabled policy. Upon finding a matching policy 35 which has a subject s, object o, and action a in common with the primitive triplet 34, the access controller authorizes the access request (not shown). The sets $l_{enable}$ and $l_{disable}$ of the matching policy 35 are evaluated by the access controller after access is authorized. These sets operate as look up tables for policy-id 30 numbers from among all access control policies 32, 33. The $l_{enable}$ list 36 of the matched policy 35 is used to find the policy-id numbers of the policies to be enabled. While it is possible that a policy to be enabled is already enabled, only the enablement of currently disabled policies is shown. After a policy-id for a policy to be enabled is found 40, the state field of that policy is changed to enabled 41. Similarly, the $l_{disable}$ list 37 of the matched policy 35 is used to find the policy-id numbers of the policies to be disabled. Again, only disablement of currently enabled policies is shown. After a policy-id for a policy to be disabled is found 38, the state field of that policy is changed to disabled 39. The algorithm implies that a policy might disable itself after successfully matching. The algorithm provides that no policy appears in both $l_{enable}$ and $l_{disable}$, so that the order of evaluation is irrelevant.

What is claimed is:

1. A method of implementing access control policies, comprising:
receiving a choreography at a server;
the server automatically generating access control policies based on the choreography, including:
deriving from the choreography a control-flow map having nodes corresponding to control-flow states, and interactions representing changes from one control-flow state to another control-flow state;
compiling an enablement plan for each of the nodes; and
representing each of the nodes with a respective policy based on the compiling, wherein each respective policy of the nodes comprises at least one of:
a respective enablement set of access control policies to be enabled in response to the policy being matched to a request for a type of access to a resource by a subject; and
a respective disablement set of access control policies to be disabled in response to the policy being matched to the request;
installing the access control policies on an access controller of the server;
receiving an initialization message; and
enabling an initial policy selected from the access control policies in response to the initialization message.

2. The method of claim 1, wherein deriving a control-flow map further comprises:
removing from the control-flow map all interactions that do not result in access to a resource;
removing from the control-flow map nodes which have no interactions; and
linking a predecessor node and a successor node for each removed node, where the removed node is not a node in a parallel interaction.

3. The method of claim 1, wherein compiling an enablement plan for a given node comprises:
building a first list comprising all parallel successor nodes of the given node;

building a second list comprising the sequential successor nodes of each parallel predecessor node of the given node for that interaction which contains the given node;

creating a reduction list comprising those nodes in both the first list and the second list;

removing from the first list any nodes in the reduction list; and removing from the second list any nodes in the reduction list.

4. The method of claim 1, further comprising:

receiving a request for a type of access to a resource by a subject;

matching the request to a policy selected from a set of enabled access control policies; and granting access to the resource based on the selected policy.

5. The method of claim 4, wherein matching the request to a selected policy comprises:

matching the request to the selected policy based on the subject, the type of access, and the resource;

enabling a first set of access control policies based on the matching of the selected policy to the request; and disabling a second set of access control policies based on the matching of the selected policy to the request.

6. An apparatus, comprising:

a policy enforcement component executing on a computer platform, the policy enforcement component to receive a choreography, the policy enforcement component to receive an initialization message;

a policy generator including a computer processor executing on the computer platform, the policy generator to automatically generate access control policies based on the choreography, including:

the policy generator to derive from the choreography a control-flow map having nodes corresponding to control-flow states, and interactions representing changes from one control-flow state to another control-flow state;

the policy generator to compile an enablement plan for each of the nodes; and the policy generator to represent each of the nodes with a respective policy based on the compiling, wherein each respective policy of the nodes comprises at least one of:

a respective enablement set of access control policies to be enabled in response to the policy being matched to a request for a type of access to a resource by a subject; and a respective disablement set of access control policies to be disabled in response to the policy being matched to the request; and an access controller executing on the computer platform, the access controller to receive the access control policies, the access controller to enable an initial access control policy selected from the access control policies in response to the initialization message.

7. The apparatus of claim 6, wherein the policy generator is further configured to:

remove from the control-flow map all interactions that do not result in access to a resource;

remove from the control-flow map nodes which have no interactions; and link a predecessor node and a successor node for each removed node, where the removed node is not a node in a parallel interaction.

8. The apparatus of claim 6, wherein the policy generator is further configured to:

build a first list comprising all parallel successor nodes of the given node;

build a second list comprising the sequential successor nodes of each parallel predecessor node of the given node for that interaction which contains the given node;

create a reduction list comprising those nodes in both the first list and the second list;

remove from the first list any nodes in the reduction list; and remove from the second list any nodes in the reduction list.

9. The apparatus of claim 6, wherein the access controller is further configured to:

receive a request for a type of access to a resource by a subject;

match the request to a policy selected from a set of enabled access control policies; and grant access to the resource based on the selected policy.

10. The apparatus of claim 9, wherein the access controller is further configured to:

match the request to the selected policy based on the subject, the type of access, and the resource;

enable a first set of access control policies based on the matching of the selected policy to the request; and disable a second set of access control policies based on the matching of the selected policy to the request.

11. A non-transitory machine-readable storage non-transitory medium having executable instructions which when executed cause a machine to perform a method comprising:

receiving a choreography;

generating access control policies based on the choreography, including:

deriving from the choreography a control-flow map having nodes corresponding to control-flow states, and interactions representing changes from one control-flow state to another control-flow state;

compiling an enablement plan for each of the nodes; and representing each of the nodes with a respective policy based on the compiling, wherein each respective policy of the nodes comprises at least one of:

a respective enablement set of access control policies to be enabled in response to the policy being matched to a request for a type of access to a resource by a subject; and a respective disablement set of access control policies to be disabled in response to the policy being matched to the request;

installing the access control policies on an access controller;

receiving an initialization message; and enabling an initial policy selected from the access control policies in response to the initialization message.

12. The machine-readable storage medium of claim 11, wherein deriving a control-flow map further comprises:

removing from the control-flow map all interactions that do not result in access to a resource;

removing from the control-flow map nodes which have no interactions; and linking a predecessor node and a successor node for each removed node, where the removed node is not a node in a parallel interaction.

13. The machine-readable storage medium of claim 11, wherein compiling an enablement plan for a given node comprises:

building a first list comprising all parallel successor nodes of the given node;

building a second list comprising the sequential successor nodes of each parallel predecessor node of the given node for that interaction which contains the given node;

creating a reduction list comprising those nodes in both the first list and the second list;

removing from the first list any nodes in the reduction list; and removing from the second list any nodes in the reduction list.

14. The machine-readable storage medium of claim 11, further comprising:

receiving a request for a type of access to a resource by a subject;

matching the request to a policy selected from a set of enabled access control policies; and granting access to the resource based on the selected policy.

15. The machine-readable storage medium of claim 14, wherein matching the request to a selected policy comprises:

matching the request to the selected policy based on the subject, the type of access, and the resource;

enabling a first set of access control policies based on the matching of the selected policy to the request; and disabling a second set of access control policies based on the matching of the selected policy to the request.

* * * * *